United States Patent
Chenault et al.

(10) Patent No.: US 9,971,395 B2
(45) Date of Patent: May 15, 2018

(54) LOW POWER CONNECTION DETECT METHOD AND SYSTEM FOR USB CHARGING

(71) Applicant: Microchip Technology Incorporated, Chandler, AZ (US)

(72) Inventors: Cecil G. Chenault, Leander, TX (US); Atish Ghosh, Austin, TX (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 332 days.

(21) Appl. No.: 14/826,980

(22) Filed: Aug. 14, 2015

(65) Prior Publication Data

US 2016/0054786 A1    Feb. 25, 2016

Related U.S. Application Data (60) Provisional application No. 62/039,705, filed on Aug. 20, 2014.

(51) Int. Cl.
 *G06F 13/00* (2006.01)
 *G06F 1/32* (2006.01)
 (Continued)

(52) U.S. Cl.
 CPC .......... *G06F 1/3287* (2013.01); *G06F 1/3212* (2013.01); *G06F 1/3243* (2013.01);
 (Continued)

(58) Field of Classification Search
 None
 See application file for complete search history.

(56) References Cited

U.S. PATENT DOCUMENTS

| | | | |
|---|---|---|---|
| 5,675,813 A | 10/1997 | Holmdahl | 713/310 |
| 5,784,581 A | 7/1998 | Hannah | 710/110 |

(Continued)

FOREIGN PATENT DOCUMENTS

| | | | |
|---|---|---|---|
| EP | 2738642 A1 | 6/2014 | G06F 1/32 |
| GB | 2352540 A | 1/2001 | G06F 13/40 |

(Continued)

OTHER PUBLICATIONS

International Search Report and Written Opinion, Application No. PCT/US2015/045999, 10 pages, dated Oct. 30, 2015.
(Continued)

*Primary Examiner* — Idriss N Alrobaye
*Assistant Examiner* — Richard B Franklin
(74) *Attorney, Agent, or Firm* — Slayden Grubert Beard PLLC (57) ABSTRACT

A USB hub has a USB hub controller, and an embedded controller, a USB port connector and associated port power control device and a controllable bypass switch providing a supply voltage to the USB port connector when the embedded controller enables it, a controllable voltage supply regulator unit providing a first output voltage which can be turned off and supplied to the port power control device, and a programmable current monitor circuit with a current sensor providing a second supply voltage to the monitor circuit, wherein during a low power mode, the USB hub controller and any port power control device are turned off and the monitor circuit is configured to provide the second supply voltage through the sensor and bypass switch to the USB connector and detects a current when a USB device is plugged into the USB port connector and wakes up the embedded controller.

25 Claims, 3 Drawing Sheets

(51) Int. Cl.
*G06F 13/40* (2006.01)
*G06F 13/42* (2006.01)

(52) U.S. Cl.
CPC ........ *G06F 1/3296* (2013.01); *G06F 13/4022* (2013.01); *G06F 13/4081* (2013.01); *G06F 13/4282* (2013.01); *Y02B 60/1228* (2013.01); *Y02B 60/1235* (2013.01)

(56) References Cited

U.S. PATENT DOCUMENTS

| | | | |
|---|---|---|---|
| 5,845,329 A | 12/1998 | Onishi et al. | 711/157 |
| 6,119,190 A | 9/2000 | Garney | 710/310 |
| 6,147,682 A | 11/2000 | Kim | 345/211 |
| 6,205,501 B1 | 3/2001 | Brief et al. | 710/100 |
| 6,308,239 B1 | 10/2001 | Osakada et al. | 710/316 |
| 6,408,351 B1 | 6/2002 | Hamdi et al. | 710/63 |
| 6,408,367 B2 | 6/2002 | Achilles et al. | 711/157 |
| 6,516,205 B1 | 2/2003 | Oguma | 455/557 |
| 6,532,512 B1 | 3/2003 | Torii et al. | 710/316 |
| 6,549,966 B1 | 4/2003 | Dickens | 710/300 |
| 6,601,109 B1 | 7/2003 | Bealkowski et al. | 709/250 |
| 6,704,824 B1 | 3/2004 | Goodman | 710/300 |
| 6,725,302 B1 | 4/2004 | Benayoun et al. | 710/62 |
| 6,732,218 B2 | 5/2004 | Overtoom et al. | 710/313 |
| 6,957,287 B2 | 10/2005 | Lou et al. | 710/72 |
| 7,040,823 B2 | 5/2006 | Silverbrook | 400/419 |
| 7,073,010 B2 | 7/2006 | Chen et al. | 710/313 |
| 7,093,057 B2 | 8/2006 | Choi | 710/313 |
| 7,246,189 B2 | 7/2007 | Ulenas | 710/305 |
| 7,346,728 B1 | 3/2008 | Jackson | 710/313 |
| 7,433,991 B2 | 10/2008 | Fujita et al. | 710/316 |
| 7,478,191 B2 | 1/2009 | Wurzburg et al. | 710/316 |
| 7,523,243 B2 | 4/2009 | Bohm et al. | 710/305 |
| 7,627,708 B2 | 12/2009 | Bohm et al. | 710/305 |
| 7,711,006 B2 | 5/2010 | Dries et al. | 370/474 |
| 8,312,199 B2 * | 11/2012 | Johnson | G06F 13/4022 710/16 |
| 8,909,842 B2 * | 12/2014 | Johnson | G06F 13/4022 710/305 |
| 8,928,907 B2 * | 1/2015 | Min | G06F 1/3206 358/1.14 |
| 2006/0056401 A1 | 3/2006 | Bohm et al. | 370/360 |
| 2006/0059293 A1 | 3/2006 | Wurzburg et al. | 710/313 |
| 2006/0227759 A1 | 10/2006 | Bohm et al. | 370/351 |
| 2006/0271802 A1 | 11/2006 | Yanagawa | 713/300 |
| 2014/0101345 A1 | 4/2014 | Ranta | 710/16 |

FOREIGN PATENT DOCUMENTS

| | | | | |
|---|---|---|---|---|
| JP | 2003256351 U | 9/2003 | | G06F 13/14 |
| KR | 20010107389 A | 12/2001 | | G06F 1/26 |
| TW | 201128380 A | 8/2011 | | G06F 1/32 |
| WO | 2005/018124 A1 | 2/2005 | | H04J 3/24 |

OTHER PUBLICATIONS

Anonymous, "Universal Serial Bus Specification rv. 2.0," 650 pages, Apr. 27, 2000.

Anonymous, "On-the-Go Supplement to the USB 2.0 Specification, Rev. 1.0," 74 pages, Dec. 18, 2001.

Anonymous, "Microsoft Computer Dictionary, 5th Edition," 3 pages, 2002.

Hyde, John, "USB Design by Example: A Practical Guide to Building I/O Devices," Intel Press: Engineer to Engineer Communication, 30 pages, Apr. 2002.

Anonymous, "CY7C65640: TetraHub™ High-Speed USB Hub Controller," Cypress Semiconductor Corporation, 25 pages, Dec. 5, 2002.

Axelson, Jan, "USB Complete: Everything you Need to Develop Custom USB Peripherals, Third Edition," Lakeview Research LLC, 560 Pages, 2005.

Excerpts of Prosecution File History of Abandoned U.S. Appl. No. 10/940,406, 289 Pages, Jan. 4, 2010.

Excerpts of Prosecution File History of Abandoned U.S. Appl. No. 11/100,299, 165 Pages, Jan. 4, 2010.

Excerpts of Prosecution File History of Abandoned U.S. Appl. No. 11/424,179, 190 pages, Jan. 4, 2010.

* cited by examiner

LOW POWER CONNECTION DETECT METHOD AND SYSTEM FOR USB CHARGING

RELATED PATENT APPLICATION

This application claims priority to commonly owned U.S. Provisional Patent Application No. 62/039,705; filed Aug. 20, 2014; which is hereby incorporated by reference herein for all purposes.

TECHNICAL FIELD

The present disclosure relates to a method and system for ground plane isolation, in particular in USB environment.

BACKGROUND

Increasing demand for low power consumption in the PC space is driving customers to conserve power in all operating states. This is especially true in the hibernate S4 or S5 state where a laptop appears to the user to be off. Several Manufacturers have also defined a new state called Connected Standby or "InstantGo" that requires ultra-lower power operation. In either state, the USB subsystem is very limited in how much power can be consumed. In the case of a hub, it should consume less than ~1 mW. That power number is unreachable in the conventional hubs. When off, the hub cannot perform a battery charging handshake, so the system effectively loses support for standard defined battery charging 1.2 or for device specific charging in the "off" state—even if power is still available on the Vbus pin of the USB port.

A second concern is overall power budget allotted to the USB port charging. 4 ports of charging support could theoretically approach 10 A. Most systems cannot support such a high current budget. A more manageable limit might be 5 A—which 2 ports could theoretically consume.

SUMMARY

Hence, there is a need for a solution that can minimize suspend and standby current for a multiport USB Hub that supports battery charging and thus help to limit a supply current to a maximum value.

According to an embodiment, a universal serial bus (USB) hub may comprise: a USB hub controller; an embedded controller configured to operate in a normal operating mode and a low power mode and coupled with the USB hub controller, wherein the embedded controller is configured to turn the USB hub controller on or off; at least one USB port connector and associated port power control device coupled with the USB hub controller and an associated controllable bypass switch coupled with the embedded controller which is configured to provide a supply voltage to the at least one USB port connector when the embedded controller enables said associated controllable bypass switch; a controllable voltage supply regulator unit having at least one output providing a first output voltage, wherein the at least one output can be controlled by the embedded controller to be turned off, wherein the at least one output of the regulator is coupled with the port power control device of said at least one USB port connector; and a programmable current monitor circuit comprising a current sensor coupled with the at least one output of the regulator unit, wherein the regulator unit comprises an internal second supply voltage regulator providing a second supply voltage to the programmable current monitor circuit, wherein during a low power mode, the USB hub controller and any port power control device are turned off and the programmable current monitor circuit is further configured to provide the second supply voltage through the current sensor and bypass switch to said at least one USB port connector and wherein the programmable current monitor circuit detects a current flowing from the internal second supply voltage regulator through the at least one USB port connector when a USB device is plugged into the at least one USB port connector and is configured to wake up the embedded controller.

According to further embodiment, the current sensor can be a shunt resistor connected between the output of the regulator unit and the port power control device of said at least one USB port connector. According to further embodiment, the programmable current monitor circuit may have a current threshold which is programmable by the embedded controller. According to further embodiment, the programmable current monitor circuit may have a programmable internal timer unit that determines when the programmable current monitor operates in a low power standby mode. According to further embodiment, the embedded controller can be switched into a sleep mode and the current monitor circuit is configured to generate a wake up signal fed to the embedded controller when a current through the current sensor exceeds the programmable current threshold. According to further embodiment, the embedded controller can be turned off during the low power mode and only receives power through a battery, the current monitor circuit further comprises a series connected resistor and diode coupled between the internal second supply voltage regulator and the output of the regulator unit for providing the second supply voltage to the current sensor. According to further embodiment, the node between resistor and diode can be connected with an input port of the embedded controller and the input port is configured to wake up the embedded controller. According to further embodiment, the controllable voltage supply regulator may comprise further controllable output providing a supply voltage for the embedded controller, wherein when the embedded controller wakes up the embedded controller is configured to turn on the further output. According to further embodiment, the internal second supply voltage regulator can be a low drop out regulator. According to further embodiment, a regulated voltage of the internal second supply voltage regulator can be lower than the output voltage at the at least one output. According to further embodiment, upon detecting a plug-in event at a USB port connector, the embedded controller can be configured to turn off the bypass switch, turn on the output of the controllable voltage supply regulator unit and to activate the USB hub controller. According to further embodiment, the USB hub may further comprise a switch coupled with a power supply input of the USB hub controller and receiving a supply voltage for the USB hub controller, the switch being controlled by the embedded controller. According to further embodiment, the USB hub may further comprise a plurality of USB port connectors, associated port power controllers, and associated controllable bypass switches.

According to another embodiment, a method for operating a USB hub comprising a plurality of USB ports, may comprise the steps of: controlling the USB hub by an embedded controller to operate in a low power mode, wherein a USB hub controller and any power port controller of the USB ports are turned off, wherein the USB hub draws a minimum current; switching the embedded controller into a low power mode; coupling a secondary voltage regulator through a bypass switch with respective USB connectors of the USB ports and monitoring a current provided by the secondary voltage regulator, and detecting a current flowing from the secondary voltage regulator through the at least one USB port connector when a USB device is plugged into the at least one USB port connector and waking up the embedded controller when said current is flowing.

According to another embodiment of the method, upon waking up, the embedded controller may turn on the USB hub controller, the power port controllers, and turns off the bypass switches. According to another embodiment of the method, the USB hub may comprise a programmable current monitor circuit having a programmable internal timer unit that determines when the programmable current monitor operates in a low power standby mode, and the method may comprise the steps: programming the current monitor to define an operating period, wherein during a defined time period of the operating period the current monitor is in a low power standby mode and during a remaining time period the current monitor is in normal operating mode. According to another embodiment of the method, the USB hub controller and the power port controllers can be turned on by activating a primary voltage regulator unit. According to another embodiment of the method, the USB hub controller may toggle a control input of a power port controller to initiate a battery charging protocol. According to another embodiment of the method, the embedded controller can be powered by a battery when in the low power mode and powered by a controllable output of a primary voltage regulator unit when in normal operating mode. According to another embodiment of the method, the programmable current monitor circuit can be configured to generate a first signal waking up the embedded controller and a second signal when a programmable current threshold is exceeded. According to another embodiment of the method, when receiving the first signal, the embedded controller may turn on the primary voltage regulator and switches to the normal operating mode. According to another embodiment of the method, the embedded controller may turn off the primary voltage regulator when no second signal has been received for a predetermined time period after the first signal has been received. According to another embodiment of the method, the embedded controller may consume a minimum current when in low power mode and wherein a programmable current monitor device is configured to monitor the current flowing from the secondary voltage regulator through the at least one USB port connector and wherein the programmable current monitor device generates a signal that wakes up the embedded controller when the current exceeds a programmable threshold. According to another embodiment of the method, when receiving the signal, the embedded controller may turn on the primary voltage regulator and switches to the normal operating mode. According to another embodiment of the method, the embedded controller may turn off the primary voltage regulator when no second signal has been received for a predetermined time period after the first signal has been received.

DETAILED DESCRIPTION

It is generally desirable that a USB hub does not draw any current when the hub is not in use. In such a scenario, the system goes into suspend or standby and a current draw is minimal. Current should only flow when a device is detected as being attached.

There are multiple Battery Charging specifications in USB environments. All of them use signaling on the data lines. Detection schemes that use the data lines have current flow, even when no device attached.

There are USB power controllers that can detect a device attachment by sensing the load current. They are a viable solution, but for a four port USB hub, four of them are required which makes for a very expensive solution.

Furthermore, the USB power controller cannot be integrated into the USB hub integrated circuit because such devices operate at 5V with up to 2.4 amperes active current per port. Therefore, integration would not be very cost effective because a 65 nm process for an integrated circuit USB hub is not designed for such a specification.

According to various embodiments, a circuit can be provided to minimize suspend and standby current for a multiport USB Hub that supports battery charging.

Figure 1:
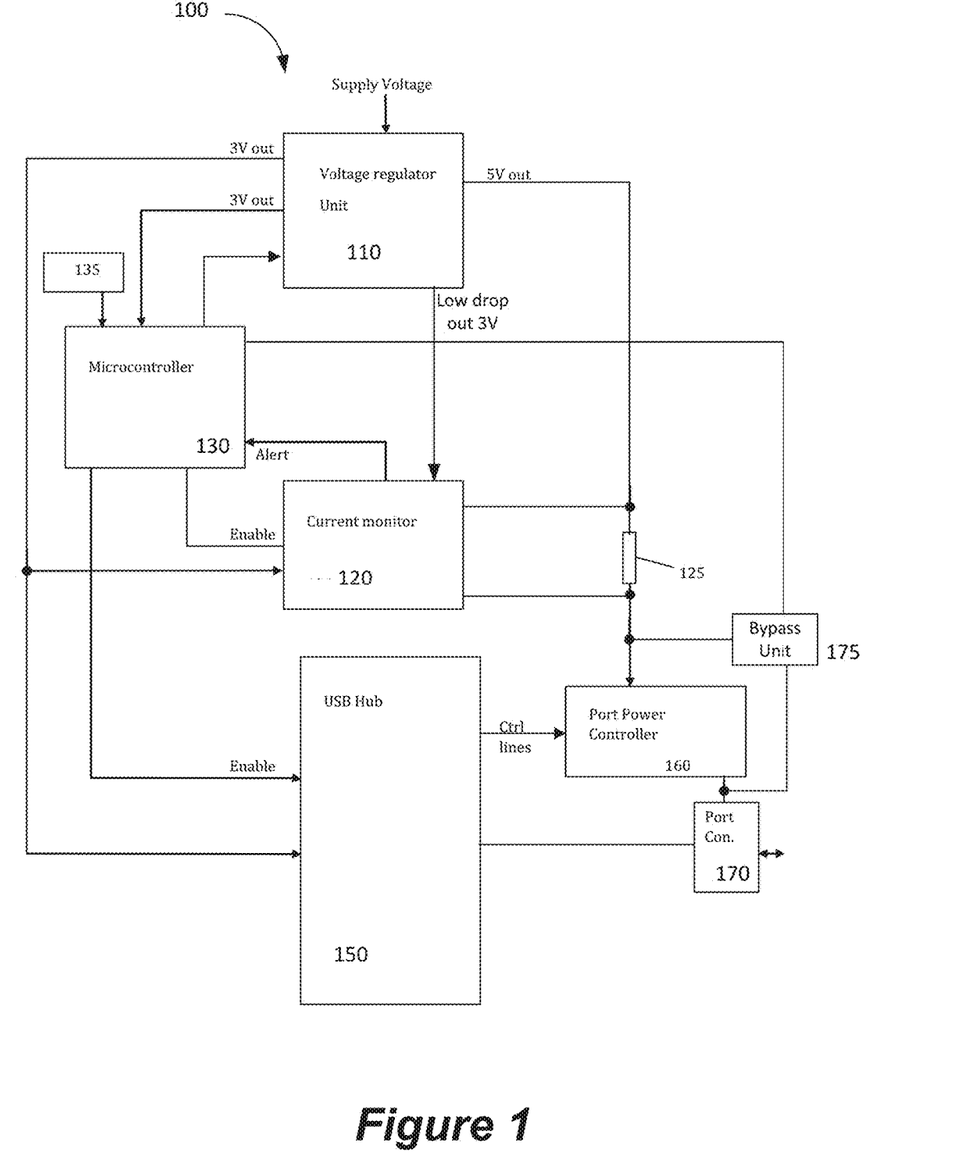
FIG. 1 shows a block diagram of a first embodiment.

FIG. 1 shows an embodiment of a USB hub circuit. The circuit 100 provides for a complete power down of the hub controller 150 when in a suspend/standby mode and uses conventional port power controllers 160 with the hub. A voltage regulator unit 110 may receive an input voltage and comprise various outputs. The voltage controller unit 110 may be controllable through the microcontroller 130. For example, a first 3V output may be controlled by the microcontroller to be turned on or off to supply power to the USB hub controller 150 and the current monitor 120. A second 3.3V output (3V out) may be provided to provide the microcontroller with a supply voltage which may be permanently active low drop out regulator to supply the microcontroller or may also be a switchable voltage regulator wherein a battery 135, e.g. a coin battery, may be used to provide power during a sleep or low power mode. The embodiment using a battery may not be necessary when the microcontroller has a sleep mode that draws basically no current. However, many available microcontrollers may not provide for such a specification. Voltage regulator unit 110 may further comprise a 3.3 V low drop out voltage regulator that supplies the current monitor 120. However, in case only a low drop out power supply is used for the microcontroller, the same output may also supply the current monitor 120.

A switchable 5V output is also provided for supplying the USB port connectors 170 through the associated port power controllers 160. Similar to the first 3.3V output (3V out), the microcontroller 130 is configured to turn this 5V output on or off. The voltage regulator unit 110 may further, for example, comprise a serial interface or any other suitable interface to be controlled by the microcontroller 130. Since certain output voltages can be completely turned off, the power consumption of the hub 150 can be reduced to effectively zero current.

According to various embodiments, the current sense monitor 120 can be used as a centralized device to detect the current flow through any of the ports. According to one embodiment, for example a MCHP PAC1710 manufactured by the assignee of the present application can be used as a central current sensing device 120. However other current sense monitors may be used. The current sense monitor 120 may also comprise a serial interface or any other suitable interface to communicate with microcontroller 130. A low value trace resistor or actual resistor 125 can be put on the printed circuit board (PCB) in the power path. According to an embodiment, on detection of a downstream USB device being attached, the current sense monitor 120 can be designed to initiate a higher power mode of the system by alerting the microcontroller 130. In this embodiment, the microcontroller is run by the low drop out supply voltage in a deep sleep mode and configured such that it can be woken up by the current monitor 120. The USB hub controller 150 and all port power controllers are turned off. Also the 5V out power supply is turned off. Thus, the current monitor 120 may be configured to supply the low drop out 3V supply voltage through shunt resistor 125 to the bypass unit 175. Bypass unit 175 is controlled by the microcontroller and when the microcontroller is in sleep mode, the bypass unit 175 supplies the USB connector 170 with the low drop out 3V power supply voltage thereby bypassing the port power controller 160. Once a USB device has been connected with the port connector 170, a small current will be drawn which can be detected by the current monitor. The current monitor will then wake up the microcontroller 130. The microcontroller 130 can then change the operating modus of the hub, for example, switch the hub into a normal operating mode from a power saving mode. For example, both the 3V out and the 5V out supply voltages will be turned on. Once the system is fully active, the USB hub 150 activates the port power controller 160 and begins normal battery charging negotiation with the attached downstream device through respective power port controllers 160.

According to some embodiments, in particular when using a battery for supplying the microcontroller in a low power mode, the microcontroller may not be able to wake up by receiving an alert signal from the current monitor 120. Since the hub controller 150 as well as the microcontroller 130 have to be effectively powered down to conserve power in a low power mode, it is required to first detect a plug-in event on the USB ports 170 to know if a device is there and wants to be charged. Thus, in a such an embodiment with minimum current, the voltage regulator unit 110 needs to be configured to only provide a supply voltage for the current monitor 120, wherein the microcontroller 130 only draws current from a coin cell battery 135.

According to various embodiments, the current monitor 120, e.g., a PAC1710 can be used, as shown in FIG. 1 to detect a USB attach event on port 170 and alert the system's embedded controller 130. The microcontroller can then signal the voltage regulator to turn on the main 3V out power supply and the 5V out power supply. Furthermore, the bypass unit 175 is deactivated and the microcontroller 130 can now check whether an alert signal from the current monitor 120 is present. Alternatively, the alert signal could cause an interrupt in microcontroller 130. The microcontroller 130 then can decide to turn on the power for the USB hub controller 150 if the USB hub controller is on a separate switchable power supply line.

The voltage regulator unit 110 can be designed to allow controller 130 to switch on the 3V and 5V out lines supplying the USB hub controller 150 and port power controller(s) 160, respectively and if implemented the second 3V out line to provide power to the microcontroller 130 itself for normal operation. In addition or alternatively, the controller may assert respective enable signals to selectively turn on the current monitor and the USB hub controller 150.

When a trigger event happens and the microcontroller has enabled the hub controller 150, the hub controller 150 will toggle VBUS, for example, via the PRT_PWR pins and cause the downstream device to re-initiate its battery charging (BC) request. At this time a normal BC session can start.

The circuit according to various embodiments has the following benefits: It provides for a charge capability on any downstream facing ports (only one port shown in FIG. 1).

The system can be aware of a current draw and the embedded controller 130 can monitor battery level through the current monitor 120 to shut off charging when a minimum threshold is reached and even estimate when that will happen. Thus, a low current operation can be provided, for example using the current monitor 120 designed to alert the microcontroller 130 upon a current event. For example, the power consumption in such a mode can be only 5 uA in sleep and 250 uA during a read mode in which the microcontroller is awake, wherein power port controllers 160 generally require 150 uA each.

Figure 2:
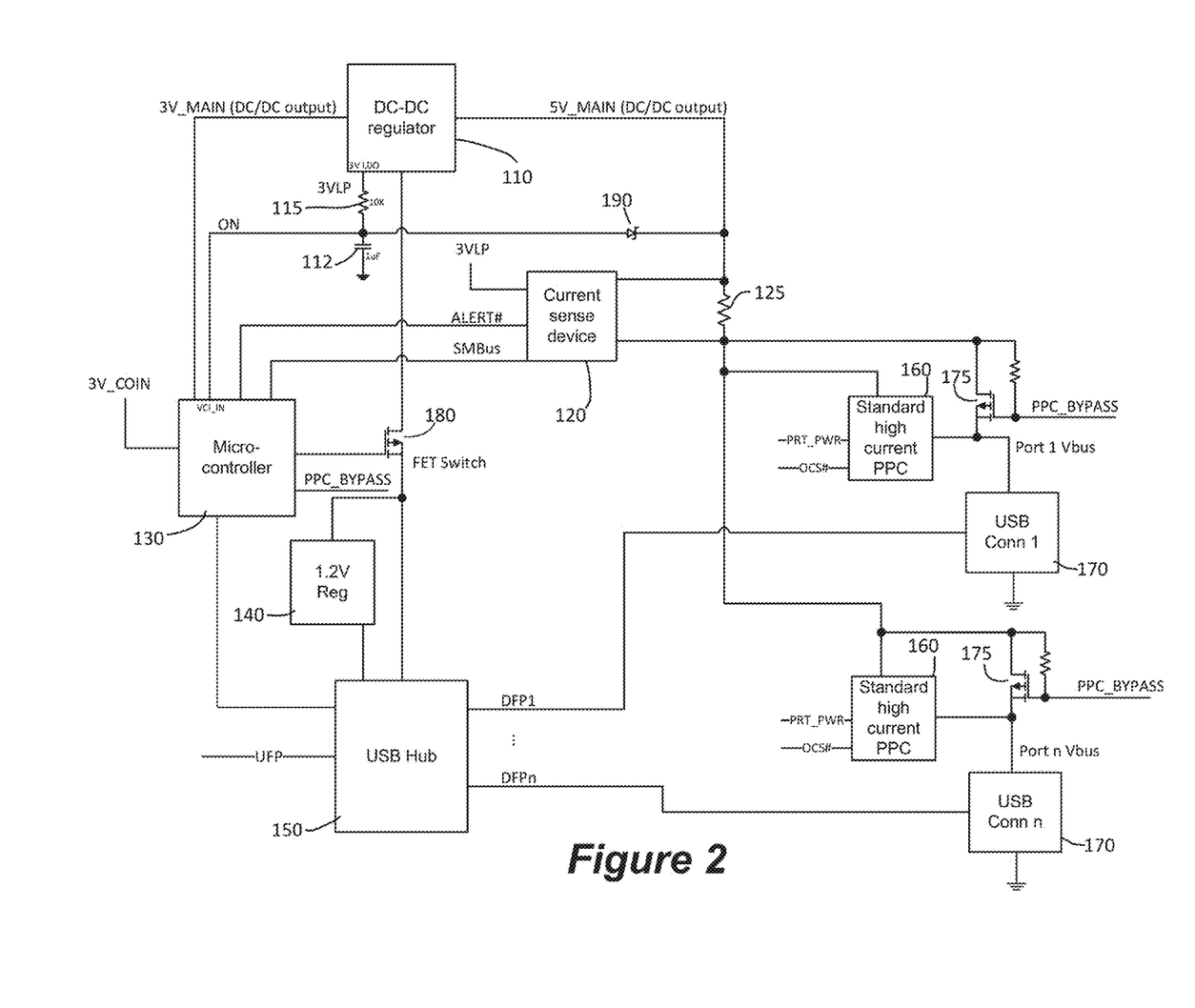
FIG. 2 shows a block diagram of a second embodiment.

According to various embodiments as shown in FIGS. 1 and 2, a very low power system level solution can be provided. The circuit can shut off ports based on a system design current threshold. This can be achieved by systematically shutting off the ports to see which ones affect the current draw, thereby indicating used/non-used ports. This solves the problem of designing a system with a fixed amount of current that might be less than what "could" be provided to multiple ports. With respect to overall costs, a circuit according to various embodiments can provide for a significant bill of materials cost savings for a 4 port solution over using 4 "smart" power port controllers.

According to FIG. 2 an exemplary circuit diagram of an "n" port USB hub 200 is shown using a microcontroller having a secondary battery power supply for a low power shut down mode. Any number of ports may be implemented. A DC-DC regulator 110 provides for various supply voltages. A first 3V supply voltage is provided for normal operation of the embedded controller 130. A second 3V supply voltage supplies the current monitor device 120 and via a FET switch 180 the USB hub controller 150. A separate 1.2 V regulator 140 may be provided to generate a low core supply voltage for the USB hub 150. The current monitor device 120 is coupled with a shunt resistor 125, preferably having a very low resistance, which is arranged between a main 5V output of regulator 110 and the various USB port controllers 160 and connectors 170. Furthermore, the current monitor 120 generates an alert signal fed to embedded controller 130. However, this alert signal will not be able to wake up the microcontroller 130 per se as will be explained in more detail below. Embedded controller is also coupled with current monitor 120 through a serial interface for example an SMBus interface as shown in FIG. 1. The embedded controller 130 can configure the current monitor through this serial interface and set appropriate current thresholds. The embedded controller 130 generates an output signal to control the FET switch 180.

The low power system level current event detection is provided by the following elements. DC-DC regulator 110 has a 3.3V low drop out regulator output 3 VLP that is coupled through a resistor 115 with an input of embedded controller 130. This 3.3V LDO output 3 VLP is furthermore coupled through a diode 190 with the main 5V regulator output rail. Furthermore a capacitor 112 may be provided between the resistor 115 and ground. The LDO output provides a low current source that is on while the system is in the very low current mode. Other low current detector circuits may be used.

Each port comprises a standard power port controller 160 and a USB connector 170. The data lines of each USB connector 170 are coupled with the USB hub 150. Each power port controller 160 provides the supply voltage to its associated USB connector 170 from the main 5V supply voltage provided by the DC-DC regulator 110. Each power port controller 160 can be bypassed through a FET 175 which is controlled by the microcontroller output signal PPC_PYBASS. The PPC_BYPASS signal may also be fed through a resistor coupling the gate of FET 175 with its source.

In a very low power mode, the main 3V output and the main 5V output are shut off, switch 180 is turned off and the 3V_COIN power supply is supplying power to the embedded controller which is in an "off mode" or deep sleep mode and drawing very little current from its coin cell, for example 8 µA. 3 VLP is the only voltage source that is on in this mode—providing current up to 250 uA to the current sense monitor 120.

The current monitor 120 can operate in a sleep mode that requires very little current, such as 5 uA, and a normal operating mode that requires a higher current, e.g., a current of 250 uA. To reduce power consumption, the current monitor 120 will cycle in and out of its sleep mode some amount of time that results in more than 5 uA but much less than 250 uA. For example, according to an embodiment, the current monitor 120 can be designed to wake up from sleep mode on its own internal timer. To this end, the current monitor 120 may be programmable to set a ratio of on and off time. For example, the current monitor can be programmed to be asleep 95% of the time and only awake 5%. Such a setting would result in an averaged current consumption of about 17.25 uA over time.

When the system is in a low power mode, the PPC_BYPASS signal is high—forcing current to USB port 170 to come from 3 VLP through bypass FETs 175. As soon as a USB device is plugged into one of the four ports, this will cause a low signal on the input of controller 130 that is connected to the node between resistor 115 and capacitor 112. The embedded controller will detect this, for example receiving an interrupt upon change signal, and wake up because the input, VCI_IN, is powered from the coin cell. As mentioned above, when supplied by 3V_COIN, the microcontroller is not able to be activated by any other signal in this embodiment. The embedded controller 130 can now activate the main 5V and 3V supply voltages by turning on the DC-DC regulator 110 and turning off PPC_BYPASS. DC-DC controller 110 may be controllable by the controller 130 to individually turn on the main 5V output and the second 3V output. DC-DC regulator 110 is active to output the main 5V supply voltage for the power port controllers 160 which may be individually activated by the hub 150. In addition, the USB hub 150 can be activated and the entire system can be woken up or only an individual port can be powered for charging while the remaining system stays in a sleep mode. Again, once the microcontroller is fully awake and the port power controllers 160 are active with the bypass units 175 deactivated, the centralized current monitor device 120 may be set to operate in normal mode and can detect a current flow and alert the microcontroller to take further action.

As shown in FIGS. 1 and 2, the embedded controller 130 can determine the current flow through current monitor 120 through its serial interface once the microcontroller and regulator 110 are fully active and decide further actions. The microcontroller can for example individually turn on or off certain ports through USB hub 150. In some embodiments, the current monitor 120 can signal the embedded controller that a threshold has been exceeded and the controller can then activate the USB hub 150 or control the hub to perform certain functions. In other embodiments, the microcontroller 130 can poll the current monitor 120. The USB hub controller 150 can then toggle the PRT_PWR inputs on the port power controllers 160. Each power port controller 160 may comprise an over current sense output (OCS#) connected with the USB hub controller 150. Once the PRT_PWR has been toggled by the hub 150, the respective USB device may start negotiating a battery charging profile and start to charge. If the device current drops under a threshold or is unplugged, the current monitor 120 de-asserts the ALERT signal. At this point, the microcontroller can turn off switch 180, tell the DC-DC regulator 110 to turn off the main rails 3V_MAIN and 5V_MAIN, and stop driving PPC_BYPASS low. This leaves the 3 VLP rail on and sets the system back to the initial state.

Figure 3:
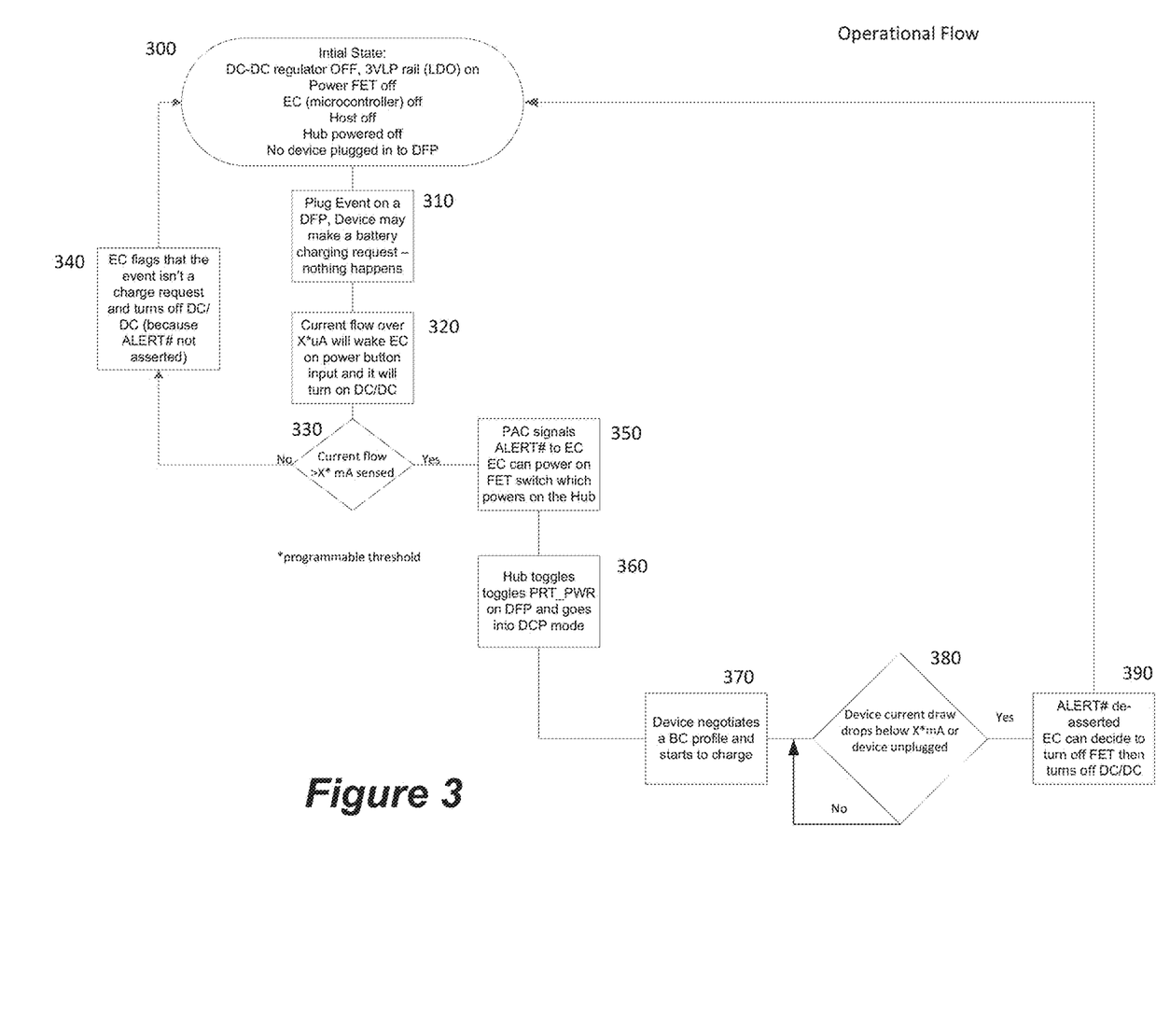
FIG. 3 shows a flow chart for operating a USB hub according to various embodiments.

FIG. 3 shows an exemplary operational flow chart. In step 300 the initial state defines that the DC-DC regulator is off and the low-drop out regulator is on. The power FET 180 is off, the microcontroller is also off and either supplied by a battery or the low-drop out regulator if its sleep current is low enough. A host (not shown) is also turned off and the hub controller 150 is turned off. All port power controllers 160 are turned off and the bypass units are turned on.

It will be assumed that no device is plugged into any of the connectors 170. Thus, only the current monitor 120 draws a minimum current of, e.g., 5 uA when put in sleep mode or 17.25 uA when operating in the cycle mode (95% off/5% on as described above). In step 310, a plug in event happening at one of the USB connectors 170. The plugged in USB device may make a battery charging request, however, due to the powered down status of the USB hub nothing will happen. However, due to the plug-in, the USB supply voltage line which receives the 3.3V supply voltage through the bypass unit 175 from the low drop out regulator will draw a small amount of current which is detected in step 320. This also causes a wake-up of the microcontroller 130 which in turn will turn on the DC-DC regulator. In step 330, the current through shunt 125 is checked by the current monitor 120. In case the current is below a programmed threshold, the alert signal will not be asserted and therefore in step 340, the microcontroller can flag that the event isn't a charge request and turns off the DC-DC regulator unit 110. The hub can be configured to go to step 340 only after a predetermined time period has passed with no current exceeding the threshold (alert signal remaining de-asserted) after the main supply voltage has been turned on.

In case the drawn current is above the threshold, then in step 350, the current monitor 120 will assert the alert signal and the microcontroller 130 can power on FET 180 which will also power on the hub controller 150. In step 360, the hub controller 150 will toggle the PRT_PWR for each port and go into a dedicated charging port (DCP) mode. In step 370 the USB device will negotiate a battery charging profile to charge its batteries. In step 380, it will be checked whether the device current drops below a threshold or whether the device is unplugged. If yes, the routine may jump to step 390 where the alert signal will be de-asserted and the microcontroller can decide further action, such as returning into the initial state and turning all power down.

In case the microcontroller 130 comprises a sleep mode that draws only a very low current, the microcontroller can be powered by the low drop out regulator that also provides power to the current monitor. However, this embodiment is only feasible if the microcontroller does not require too much power in the normal operating mode and allows for the use of the low drop out regulator as the main power source during normal operation.

Power and Cost Saving Examples

Conventional 4 port battery charging Hub and simple port power controllers: 3-5 mA at 3.3V=10 to 17 mW.

Conventional 4 port battery charging Hub and current sensing port power controllers according to various embodiments: Per port: 150 uA at 5V=0.75 mW. Thus, for a 4 Port solution: 4×0.75=3 mW Proposed solution according to various embodiments: Suspend power=5 uA at 5V=0.025 mW. Savings goes up proportionally with number of ports.

The various embodiments also provide for a significant cost saving as stated above because using a current sensor instead of a plurality of port power controllers provides for up to 50% cost savings when implementing a four port hub.

The invention claimed is:

1. A universal serial bus (USB) hub, comprising:
a USB hub controller;
an embedded controller configured to operate in a normal operating mode and a low power mode and coupled with the USB hub controller, wherein the embedded controller is configured to turn the USB hub controller on or off;
at least one USB port connector and associated port power control device coupled with the USB hub controller and an associated controllable bypass switch coupled with the embedded controller which is configured to provide a supply voltage to the at least one USB port connector when the embedded controller enables said associated controllable bypass switch;
a controllable voltage supply regulator unit having at least one output providing a first output voltage, wherein the at least one output can be controlled by the embedded controller to be turned off, wherein the at least one output of the regulator is coupled with the port power control device of said at least one USB port connector; and
a programmable current monitor circuit comprising a current sensor coupled with the at least one output of the regulator unit, wherein the regulator unit comprises an internal second supply voltage regulator providing a second supply voltage to the programmable current monitor circuit, wherein during a low power mode, the USB hub controller and any port power control device are turned off and the programmable current monitor circuit is further configured to provide the second supply voltage through the current sensor and bypass switch to said at least one USB port connector and wherein the programmable current monitor circuit detects a current flowing from the internal second supply voltage regulator through the at least one USB port connector when a USB device is plugged into the at least one USB port connector and is configured to wake up the embedded controller.

2. The USB hub according to claim 1, wherein the current sensor is a shunt resistor connected between the output of the regulator unit and the port power control device of said at least one USB port connector.

3. The USB hub according to claim 2, wherein the programmable current monitor circuit has a current threshold which is programmable by the embedded controller.

4. The USB hub according to claim 3, wherein the embedded controller is switched into a sleep mode and the current monitor circuit is configured to generate a wake up signal fed to the embedded controller when a current through the current sensor exceeds the programmable current threshold.

5. The USB hub according to claim 1, wherein the programmable current monitor circuit has a programmable internal timer unit that determines when the programmable current monitor operates in a low power standby mode.

6. The USB hub according to claim 1, wherein the embedded controller is turned off during the low power mode and only receives power through a battery, the current monitor circuit further comprises a series connected resistor and diode coupled between the internal second supply voltage regulator and the output of the regulator unit for providing the second supply voltage to the current sensor.

7. USB hub according to claim 6, wherein the node between resistor and diode is connected with an input port of the embedded controller and the input port is configured to wake up the embedded controller.

8. The USB hub according to claim 6, wherein the controllable voltage supply regulator comprises another controllable output providing a supply voltage for the embedded controller, wherein when the embedded controller wakes up the embedded controller is configured to turn on the another output.

9. The USB hub according to claim 6, wherein the internal second supply voltage regulator is a low drop out regulator.

10. The USB hub according to claim 1, wherein a regulated voltage of the internal second supply voltage regulator is lower than the output voltage at the at least one output.

11. The USB hub according to claim 1, wherein upon detecting a plug-in event at a USB port connector, the embedded controller is configured to turn off the bypass switch, turn on the output of the controllable voltage supply regulator unit and to activate the USB hub controller.

12. The USB hub according to claim 1, comprising a switch coupled with a power supply input of the USB hub controller and receiving a supply voltage for the USB hub controller, the switch being controlled by the embedded controller.

13. The USB hub according to claim 1, comprising a plurality of USB port connectors, associated port power controllers, and associated controllable bypass switches.

14. A method for operating a USB hub comprising a plurality of USB ports, the method comprising:
controlling the USB hub by an embedded controller to operate in a low power mode, wherein a USB hub controller and any power port controller of the USB ports are turned off, wherein the USB hub draws a low power operating current;
switching the embedded controller into a low power mode;
coupling a secondary voltage regulator through a bypass switch with respective USB connectors of the USB ports and monitoring a current provided by the secondary voltage regulator, and
detecting a current flowing from the secondary voltage regulator through the at least one USB port connector when a USB device is plugged into the at least one USB port connector and waking up the embedded controller when said current is flowing.

15. The method according to claim 14, wherein upon waking up, the embedded controller turns on the USB hub controller, the power port controllers, and turns off the bypass switches.

16. The method according to claim 15, wherein the USB hub comprises a programmable current monitor circuit having a programmable internal timer unit that determines when the programmable current monitor operates in a low power standby mode, and wherein the method comprises programming the current monitor to define an operating period, wherein during a defined time period of the operating period the current monitor is in a low power standby mode and during a remaining time period the current monitor is in normal operating mode.

17. The method according to claim 15, wherein the USB hub controller and the power port controllers are turned on by activating a primary voltage regulator unit.

18. The method according to claim 14, wherein the USB hub controller toggles a control input of a power port controller to initiate a battery charging protocol.

19. The method according to claim 14, wherein the embedded controller is powered by a battery when in the low power mode and powered by a controllable output of a primary voltage regulator unit when in normal operating mode.

20. The method according to claim 19, wherein the programmable current monitor circuit is configured to generate a first signal waking up the embedded controller and a second signal when a programmable current threshold is exceeded.

21. The method according to claim 20, wherein when receiving the first signal, the embedded controller turns on the primary voltage regulator and switches to the normal operating mode.

22. The method according to claim 21, wherein the embedded controller turns off the primary voltage regulator when no second signal has been received for a predetermined time period after the first signal has been received.

23. The method according to claim 14, wherein the embedded controller consumes a current when in low power mode and wherein a programmable current monitor device is configured to monitor the current flowing from the secondary voltage regulator through the at least one USB port connector and wherein the programmable current monitor device generates a signal that wakes up the embedded controller when the current exceeds a programmable threshold.

24. The method according to claim 23, wherein when receiving the signal, the embedded controller turns on the primary voltage regulator and switches to the normal operating mode.

25. The method according to claim 24, wherein the embedded controller turns off the primary voltage regulator when no second signal has been received for a predetermined time period after the first signal has been received.

* * * * *